United States Patent
Chu et al.

(10) Patent No.: US 7,498,991 B2
(45) Date of Patent: Mar. 3, 2009

(54) MINIATURE COMBO BUILT-IN ANTENNA STRUCTURE

(75) Inventors: Te-Yi Chu, Tainan Hsien (TW); Tsai-Yi Yang, Tainan Hsien (TW)

(73) Assignee: Cirocomm Technology Corp., Tainan Hsien (TW)

( * ) Notice: Subject to any disclaimer, the term of this patent is extended or adjusted under 35 U.S.C. 154(b) by 136 days.

(21) Appl. No.: 11/772,528

(22) Filed: Jul. 2, 2007

(65) Prior Publication Data

US 2009/0009406 A1 Jan. 8, 2009

(51) Int. Cl.
*H01Q 1/24* (2006.01)
(52) U.S. Cl. ...................... 343/702; 343/725
(58) Field of Classification Search ............. 343/702, 343/700 MS, 725, 788, 895, 846
See application file for complete search history.

(56) References Cited

U.S. PATENT DOCUMENTS

| 7,199,759 | B2 * | 4/2007 | Noguchi et al. | 343/702 |
| 7,369,091 | B2 * | 5/2008 | Man et al. | 343/702 |
| 2003/0090429 | A1 * | 5/2003 | Masudaya et al. | 343/788 |
| 2004/0046699 | A1 * | 3/2004 | Amano et al. | 343/702 |

* cited by examiner

*Primary Examiner*—Hoang V Nguyen

(57) ABSTRACT

A miniature combo built-in antenna structure built in a personal navigation device (PND) includes a substrate, a first antenna unit and a second antenna unit. The first antenna unit is a signal receiving antenna of a global positioning system (GPS), and the second antenna unit is a signal receiving antenna of a traffic message channel (TMC) receiving module. The first and second antenna units are integrated into a substrate and built in the GPS, for receiving GPS signals as well as related information of road conditions and weather.

18 Claims, 9 Drawing Sheets

MINIATURE COMBO BUILT-IN ANTENNA STRUCTURE

BACKGROUND OF THE INVENTION

1. Field of the Invention

The present invention relates to an antenna, and more particular to a miniature combo built-in antenna structure.

2. Description of Prior Art

In a global positioning system (GPS), the time of transmitting a radio signal is used to measure distance by basic trigonometric positioning principles, and three or more GPS satellites are adopted for cross comparisons. By converting signal receiving speed and time to obtain the distance from the satellite as well as using an electronic map built in a GPS receiver, the position of an object or a person can be located or identified.

At present, automobile personal navigation devices (PND) become increasingly popular. To allow users to access current road conditions and weather reports while driving a motor vehicle, a traffic message channel (TMC) receiving module is usually built in the personal navigation device (PND). Since ground broadcasting uses a FM Radio Data System (RDS) to broadcast current traffic and weather information, and such communication application is generally called Radio Data System (RDS)/Traffic Message Channel (TMC) and provides three kinds of services as listed below:

1. The area, road section and direction affected by a recent car accident.
2. The time duration of a continuous traffic or weather condition.
3. The suggested driving route based on the aforementioned information. Traffic message is updated once every five minutes. The way for the RDS/TMC to collect traffic information is substantially the same as that of satellite broadcasting, and sensors and cameras installed at roadsides by local traffic departments are used for collecting information and statistics.

After a personal navigation device (PND) is built in a TMC receiving module, an antenna slot of a TMC receiving module is created on a housing of the personal navigation device (PND), so that users can plug an external earphone into the antenna slot and use it as a dedicated antenna or a TMC receiving module. The earphone is used as an antenna, and thus there is no issue of installing an antenna in a motor vehicle. As to drivers, it is not safe to listen to the road condition and weather report while driving a motor vehicle. However, the size of the dedicated antenna of a general TMC receiving module is large and uneasy-to-install, and thus causing tremendous inconvenience to users.

SUMMARY OF THE INVENTION

In view of the foregoing shortcomings of the prior art, the inventor of the present invention based on years of experience in the related industry to conduct experiments and modifications, and finally developed a miniature combo built-in antenna structure in accordance with the present invention.

Therefore, it is a primary objective of the present invention to provide a miniature combo built-in antenna structure, wherein GPS and TMC antennas are integrated onto a circuit board, and built in a PND, so that users can use the antenna without the needs of building an antenna and wearing an earphone.

To achieve the aforementioned objective, the present invention provides a miniature combo built-in antenna structure, comprising:

a substrate, having two grounding metal surfaces disposed on the right side of the front side and backside of the substrate respectively, and the grounding metal surface at the backside of the substrate is electrically connected to a circuit contact point area, and the circuit contact point area includes a first signal output contact point electrically connected to a cable, and a penetrating hole disposed at a position deviated from the center position of the two grounding metal surfaces, and penetrating the substrate and electrically connecting the circuit contact point area at the backside of the substrate, and the left side of the substrate has two symmetric first contact point and second contact point, and a linear micro strip line is extended from the first contact point and electrically extended from the backside of the substrate and disposed adjacent to the grounding metal surface, and a distal end of the micro strip line extended from the substrate has a second signal output contact point electrically connected to a cable. Further, a match circuit is installed between the micro strip line at the backside of the substrate and the grounding metal surface and electrically connected to a contact point, and metal plates with a larger area are extended from the second contact point and disposed on the front side and backside of the substrate, and the metal plates have the functions of fine tuning frequency and improving radiating efficiency;

a first antenna unit, which is a patch antenna unit and includes a base disposed thereon, a radiating metal plate disposed on a surface of the base, and the bottom surface of the base has a grounding metal plate electrically connected to the grounding metal surface at the front side of the substrate, and each of the base, radiating metal plate and grounding metal plate has a through hole for passing into a signal feeder and electrically connecting the radiating metal plate, such that the radiating metal plate defines a signal feeding terminal, and an end of the signal feeder is passed through the penetrating hole of the substrate and electrically connected to the circuit contact point area, and the signal feeder passing through the grounding metal plate is not electrically connected to the grounding metal plate, but simply electrically connected to the penetrating hole of the substrate, and thus the signals received by the first antenna unit can be transmitted directly to the circuit contact point area at the backside of the substrate; and a second antenna unit, having a rectangular solid dielectric carrier with both ends covered with a first electrode and a second electrode that are electrically connected to the first contact point and the second contact point disposed on the front side of the substrate respectively, and a conducting wire covered onto the surface of a carrier electrically connected between the two electrodes.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
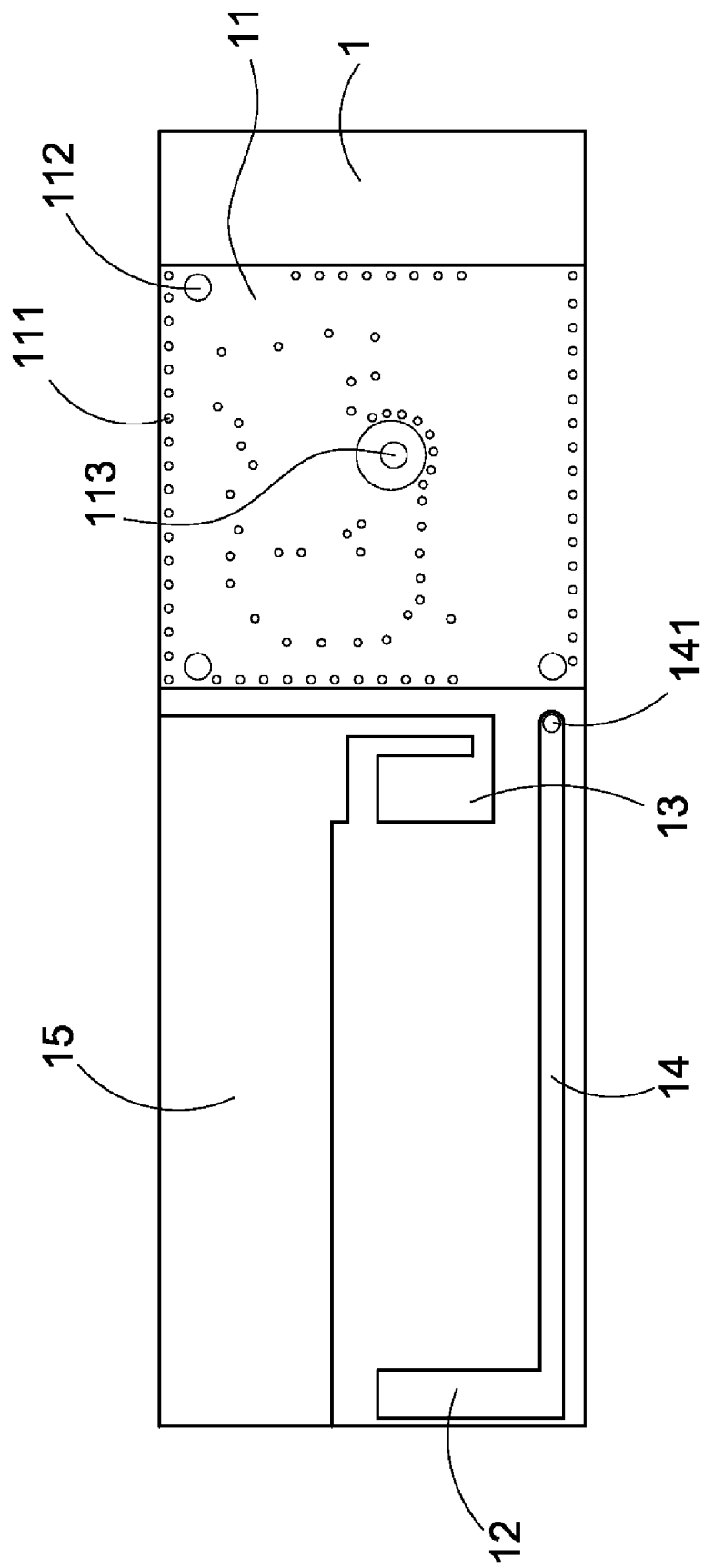
FIG. 1 is a schematic front side view of a circuit substrate of a miniature combo antenna structure of the present invention.
Figure 2:
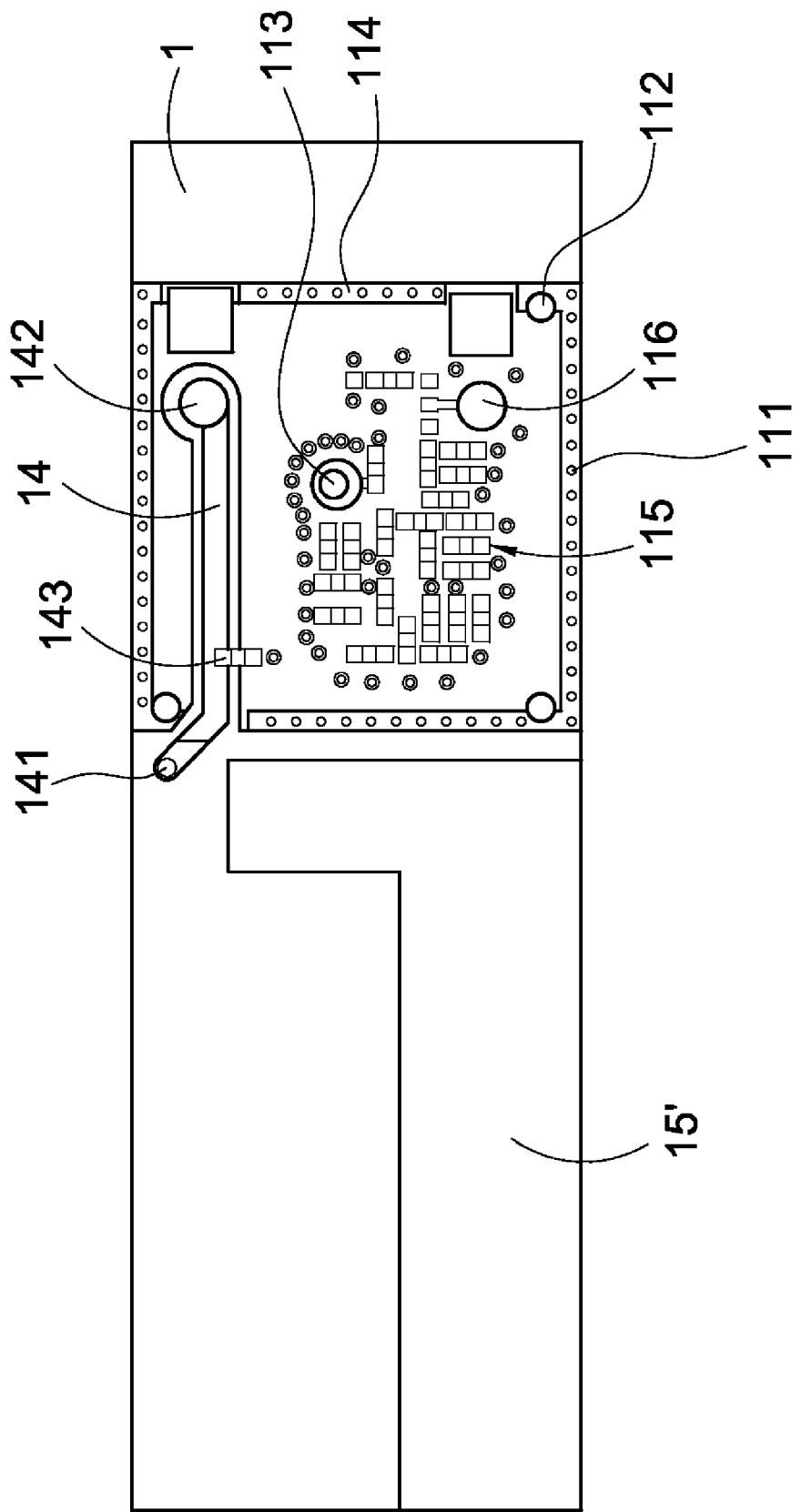
FIG. 2 is a schematic backside view of a circuit substrate of a miniature combo antenna structure of the present invention.

Referring to FIGS. 1 and 2 for the front side and backside views of a circuit substrate of a miniature combo antenna structure of the present invention respectively, the miniature combo antenna structure comprises: a circuit substrate 1; a grounding metal surface 11 disposed on the right side of the front side of the substrate 1 for electrically connecting an antenna unit (not shown in the figure) of a global positioning system (GPS) to a grounding metal plate; and a plurality of through holes 111, 112 with different diameters disposed around the grounding metal surface 11, and a conductor (such as conducting wire, solder and conducting pillar) can be passed into the through hole 111 with a smaller diameter and electrically connected to the grounding metal surface 114 at the backside end and a circuit contact point area 115 (which will be described in details later), and the circuit contact point area 115 has a signal output contact point 116 electrically connected to a cable (not shown in the figure) for transmitting a signal to the global positioning system (not shown in the figure). Further, the grounding metal surface 11 has a penetrating hole 113 disposed at a position deviated from the center position and penetrating the substrate 1 and electrically connected with the circuit contact point area 115.

The left side of the substrate 1 has two symmetric first contact point 12 and second contact point 13 for electrically connecting an antenna unit (not shown in the figure) of a traffic message channel (TMC), and a linear micro strip line 14 is extended electrically from the first contact point 12 to the backside side of the substrate 1 through the through hole 141 and adjacent to the grounding metal surface 114, and an end of the micro strip line 14 on the backside side of the substrate 1 has a signal output contact point 142 electrically connected to a cable (not shown in the figure) for outputting and transmitting a signal to the traffic message channel (TMC) module (not shown in the figure). Further, a contact point 143 electrically connected to a match circuit is disposed adjacent to a position between the micro strip line 14 extended from the backside side of the substrate 1 and the grounding metal surface 114, and a metal plate 15, 15' with a larger area is extended from the second contact point 13 and disposed respectively on the front side and backside sides of the substrate 1, and the metal plate 15, 15' has the functions of fine tuning the frequency or improving the radiating efficiency.

Figure 3:
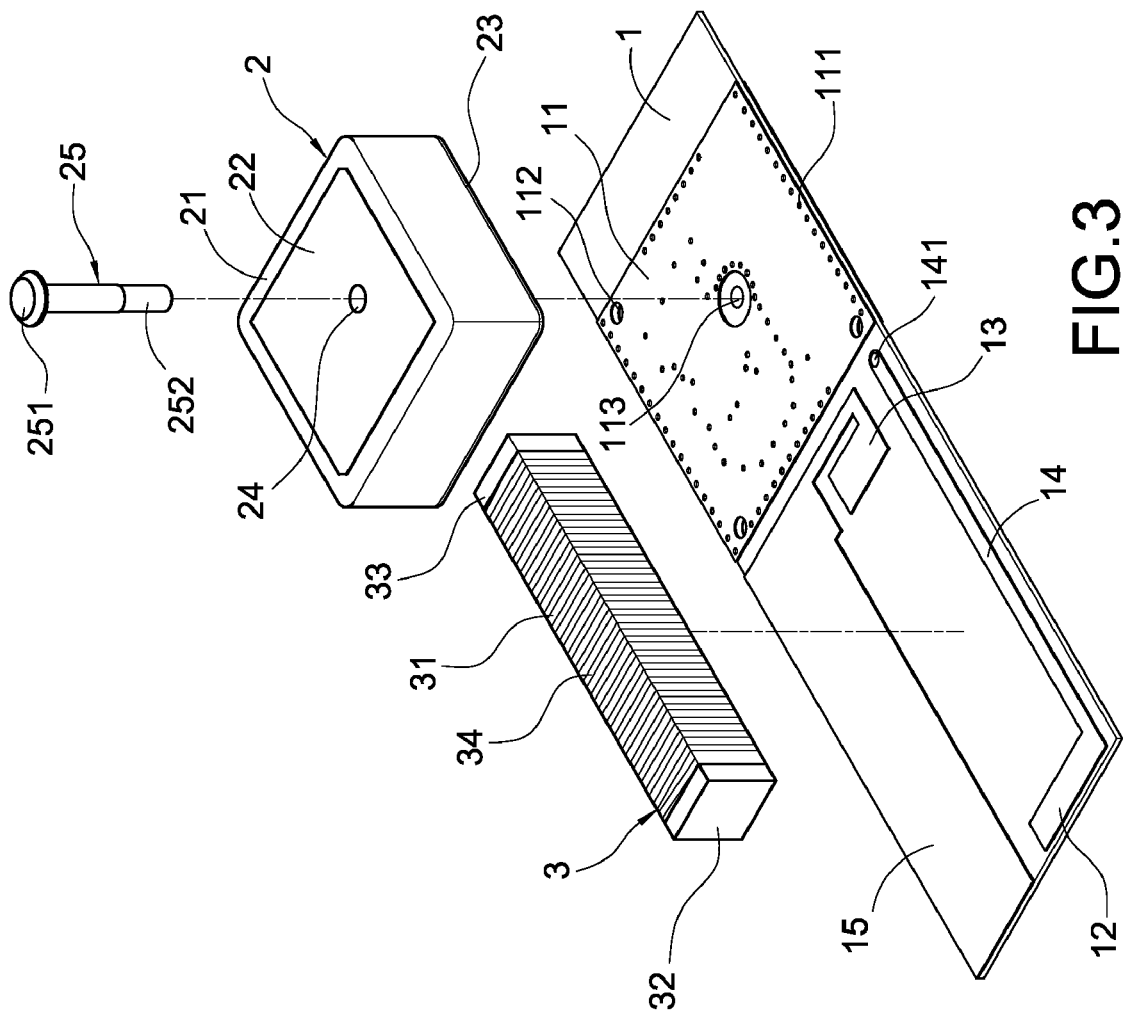
FIG. 3 is an exploded view of a miniature combo antenna structure of the present invention.
Figure 4:
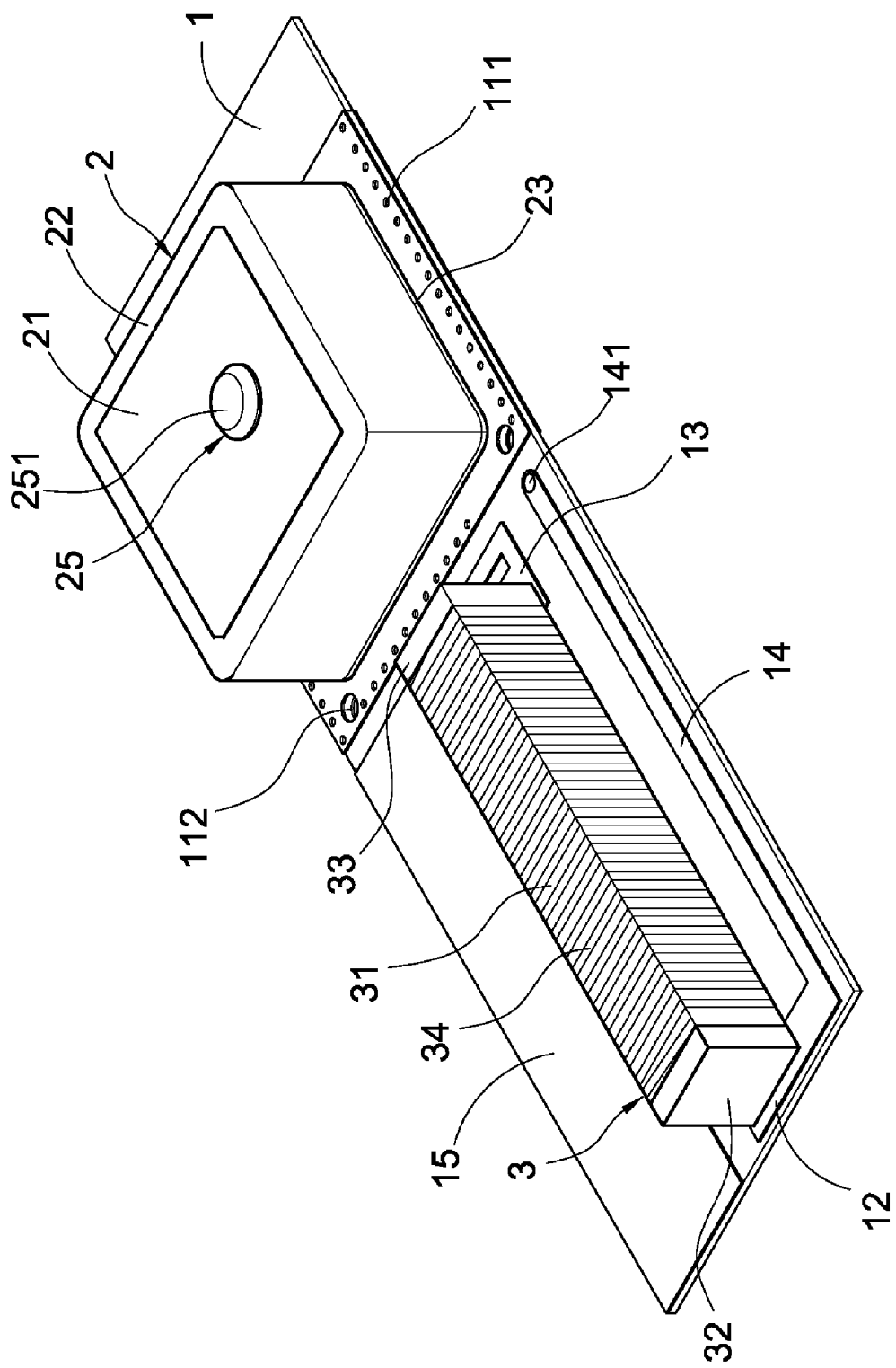
FIG. 4 is a perspective view of a miniature combo antenna structure of the present invention.

Referring to FIGS. 3 and 4 for an exploded view and a perspective view of a miniature combo antenna structure of the present invention respectively, the miniature combo antenna structure comprises a substrate 1, a first antenna unit 2 and a second antenna unit 3.

The substrate 1 has been described before, and thus will not be described here again.

The first antenna unit 2 is a cubic patch antenna unit having a base 21, and the base 21 is made of a dielectric material such as a ceramic material having a high dielectric constant (K>4), and the surface of the base 21 has a radiating metal plate 22, and the bottom surface of the base 21 has a grounding metal plate 23. Each of the base 21, radiating metal plate 22 and grounding metal plate 23 has a through hole 24 for passing a T-shaped signal feeder 25, and a hemispherical head 251 of the signal feeder 25 is electrically connected to the radiating metal plate 22, such that the radiating metal plate 22 defines a signal receiving terminal, and the signal feeder 25 defines a signal feeding terminal, and a distal end 252 passing through the signal feeder 25 of the grounding metal plate 23 is not electrically connected to the grounding metal plate 23 but simply passing through and electrically connecting a penetrating hole 113 of the substrate 1, so that the signals received by the first antenna unit 1 can be transmitted directly to the circuit contact point area 114 of the substrate 1.

The second antenna unit 3 is a FM channel receiving antenna, and a rectangular solid carrier 31 is made of a dielectric material with a high dielectric constant (>4), and both ends of the carrier 31 are covered with a first electrode 32 and a second electrode 33, and a helix conducting wire 34 is covered onto a surface of the carrier 31 and electrically connected between the first and second electrodes 32, 33.

When the substrate 1 is combined with the first and second antenna units 2, 3, the grounding metal plate 23 electrically connects the first antenna unit 2 to the grounding metal surface 11 at the front side of the substrate 1, and the distal end 252 of the signal feeder 25 is electrically connected to the penetrating hole 113 of the substrate 1, so that the signals received by the first antenna unit 1 can be transmitted directly to the circuit contact point area 114 of the substrate 1, and the first and second electrodes 32, 33 of the second antenna unit 3 are electrically connected to the first contact point 12 and the second contact point 13 of the substrate 1 respectively.

Figure 5:
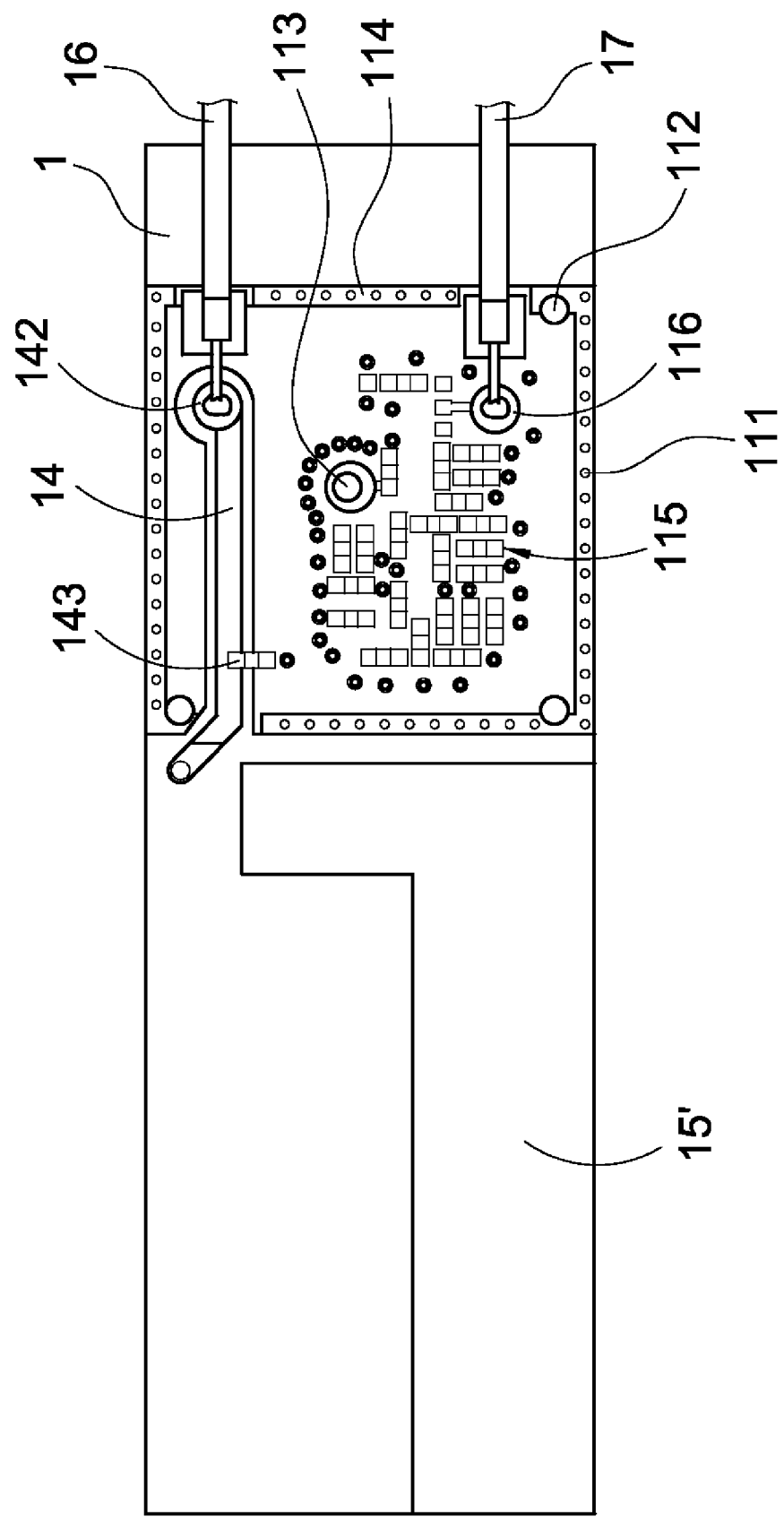
FIG. 5 is a schematic view of another preferred embodiment of the present invention.

Referring to FIG. 5 for a schematic view of another preferred embodiment of the present invention, the contact point 142 at a distal end of the micro strip line 14 is electrically connected to a cable 16, such that the signal of FM traffic message received by the second antenna unit 3 can be transmitted to a traffic message channel (TMC) module through the cable 16. The signal output contact point 116 is electrically connected to cable 17, such that the GPS signal received by the first antenna unit 2 can be transmitted to the GPS module through the cable 17.

Figure 6:
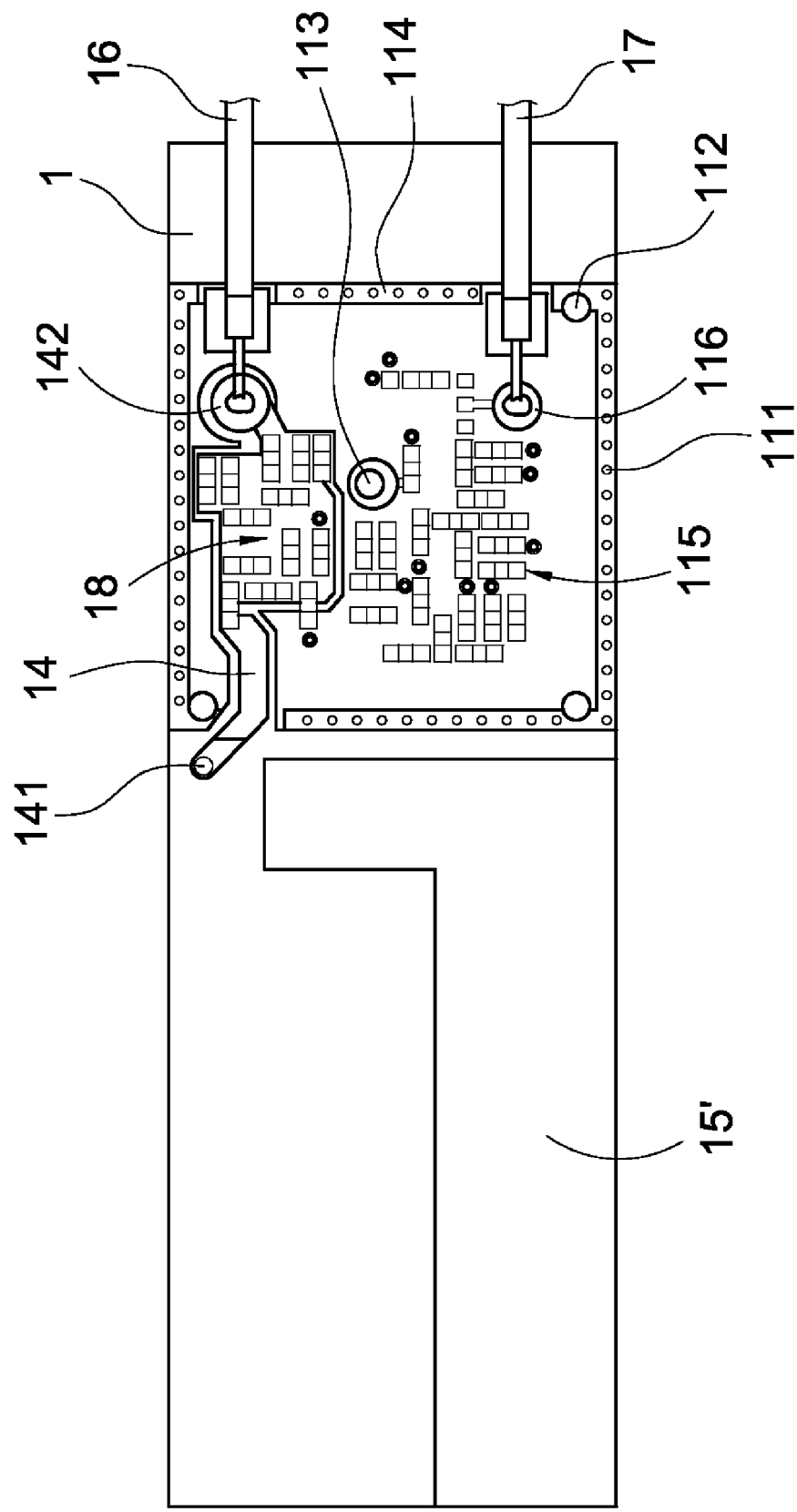
FIG. 6 is a schematic view of a further preferred embodiment of the present invention.
Figure 7:
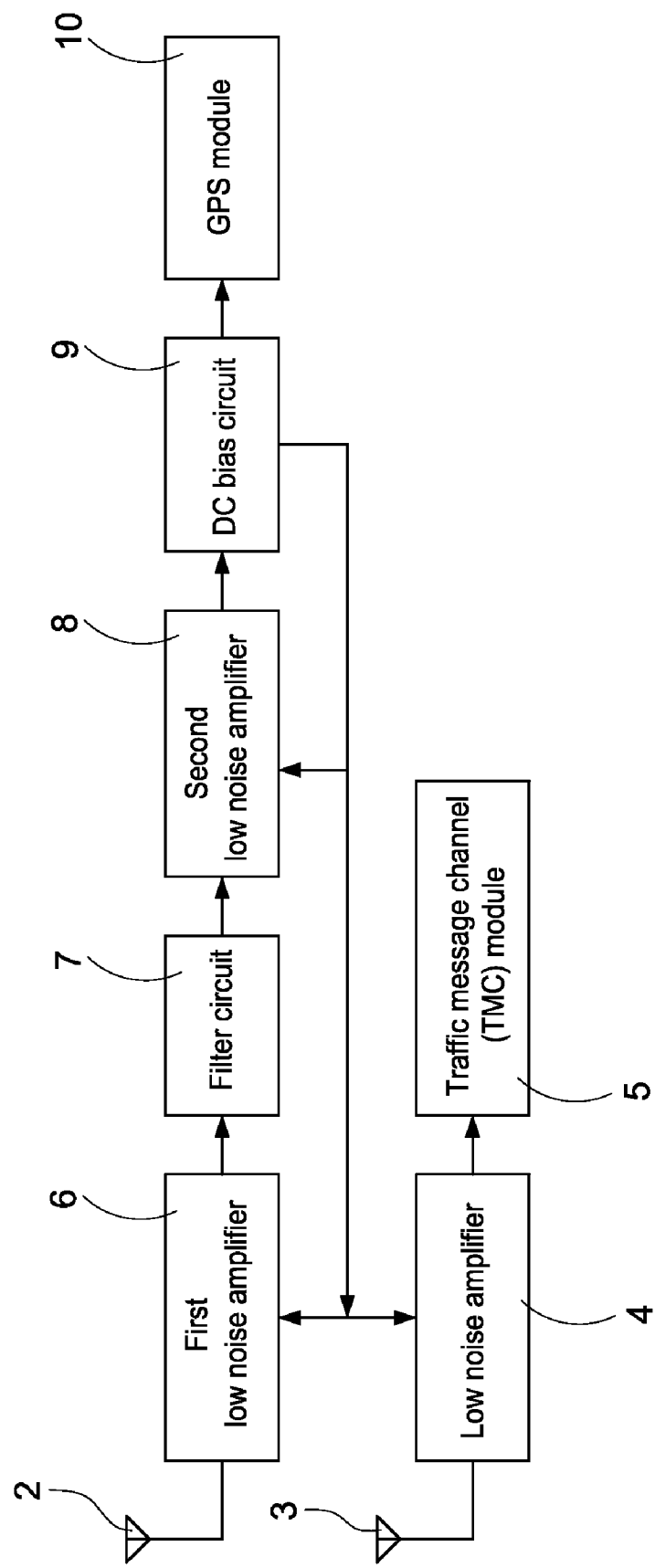
FIG. 7 is a schematic circuit block diagram of FIG. 6.

Referring to FIGS. 6 and 7 for a schematic view of a further preferred embodiment of the present invention and a schematic circuit block diagram of FIG. 6 respectively, a circuit contact point area 18 is disposed between the micro strip line 14 at the backside of the substrate 1 and the signal output contact point 142 for electrically connecting a low noise amplifier 4 or a low noise amplifier 4 that is electrically connected to a match circuit and a circuit of the circuit contact point area 115, so that the DC bias voltage required by the low noise amplifier 4 is supplied to a DC bias circuit adjacent to the circuit contact point area 115. After the second antenna unit 3 receives a TMC signal, and the low noise amplifier 4 or match circuit electrically connected to the low noise amplifier 4 processes the signal, the processed signal is transmitted to the traffic message channel (TMC) module 5 through the cable 16, and thus users can know about the traffic or road conditions at different places.

The circuit in the circuit contact point area 115 comprises a first low noise amplifier 6, a filter circuit 7, a second low noise amplifier 8 and a DC bias circuit 9. After the first antenna unit 2 receives a GPS signal, which is processed by the first low noise amplifier 6, filter circuit 7, second low noise amplifier 8 and DC bias circuit 9, the signal is transmitted to a GPS module 10 through the cable 17, and thus users can drive according to the route displayed in a GPS device.

Figure 8:
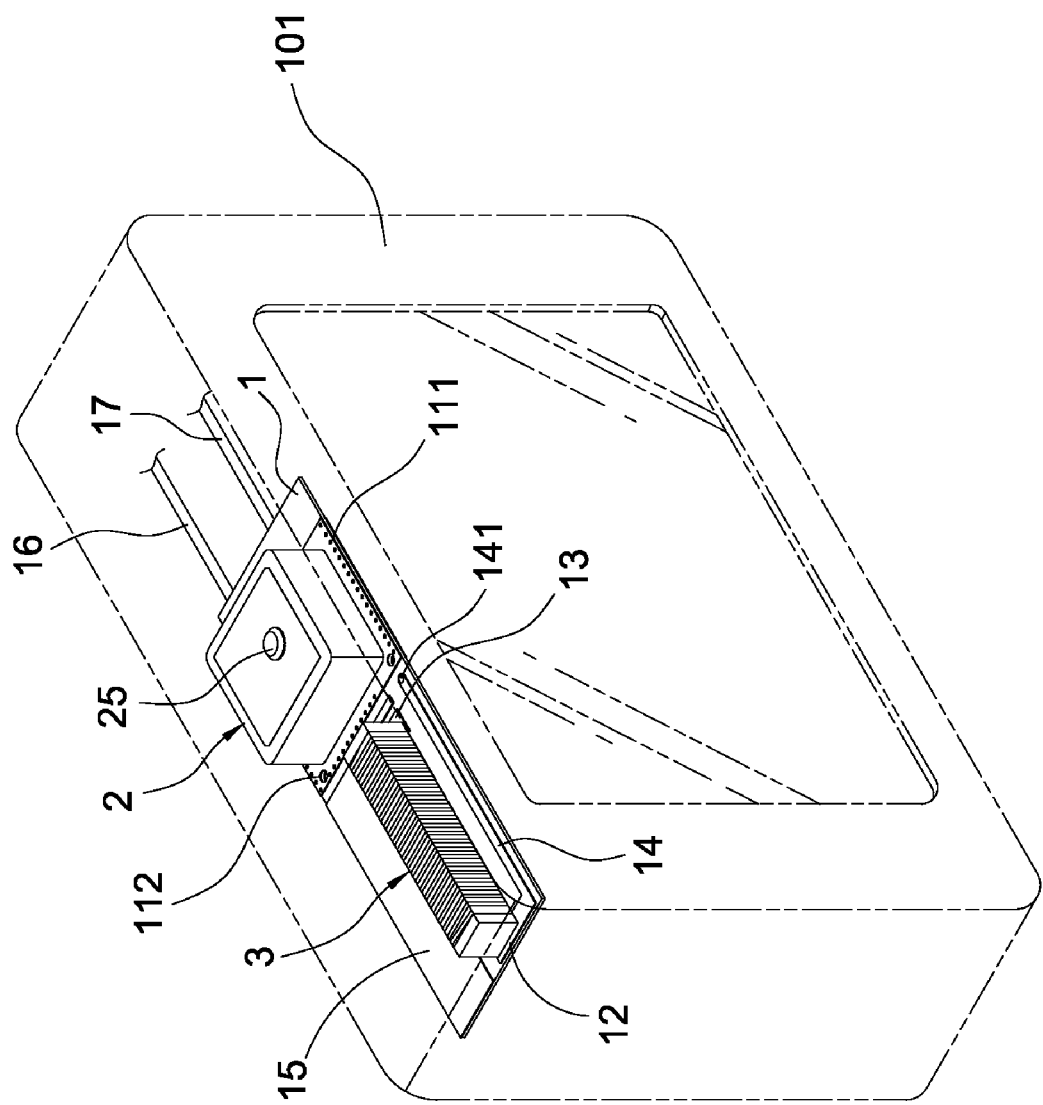
FIG. 8 is a schematic view of another further preferred embodiment of the present invention.

Referring to FIG. 8 for a schematic view of another further preferred embodiment of the present invention, an antenna structure is built in a personal navigation device (PND) 101 for receiving a GPS signal as well as information about the current road conditions, after the first antenna unit 2 and the second antenna unit 3 are integrated in a substrate 1.

Figure 9:
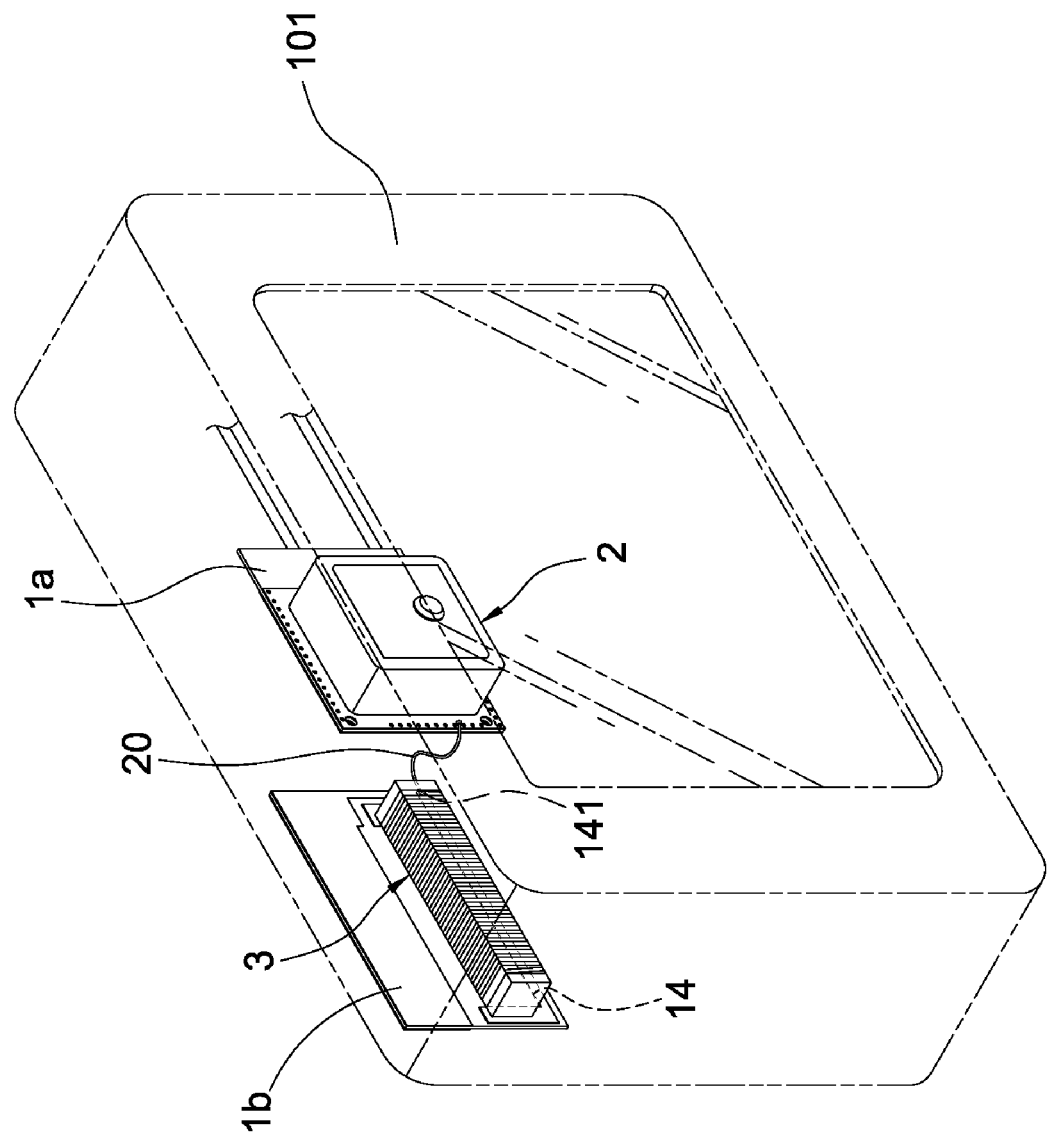
FIG. 9 is a schematic view of another preferred embodiment of the present invention.

Referring to FIG. 9 for a schematic view of another preferred embodiment of the present invention, the first antenna unit 2 and the second antenna unit 3 are electrically connected to different substrates 1a, 1b respectively and installed inside the personal navigation device (PND) 101, and the through hole 141 of the micro strip line 14 on the substrate 1b is electrically connected to a coaxial cable 20, and an other end of the coaxial cable 20 is passed through the substrate 1a and electrically connected to the micro strip line 14 at the backside of the substrate 1a, such that the personal navigation device (PND) 101 can receive GPS signals as well as the information of current road conditions.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A miniature combo built-in antenna structure, applied in an antenna structure built in a personal navigation device, the antenna structure comprising:

a substrate, having a grounding metal surface disposed on right side of a front side of the substrate, and a circuit contact point area electrically connected to another grounding metal surface disposed on right side of a backside of the substrate, and the circuit contact point area including a first signal output contact point, and a penetrating hole disposed at a position deviated from a center position of the two grounding metal surfaces, such that the penetrating hole is electrically connected with the circuit contact point area on the backside of the substrate, and a left side of the substrate has two symmetric first contact point and second contact point, and a linear micro strip line is extended from the first contact point and electrically extended from the backside of the substrate and disposed adjacent to the grounding metal surface, and an end of the micro strip line extended from the substrate has a second signal output contact point;

a first antenna unit, having a base disposed thereon, a radiating metal plate disposed on a surface of the base, and the bottom surface of the base having a grounding metal plate electrically connected to the grounding metal surface at the front side of the substrate, and each of the base, radiating metal plate and grounding metal plate having a through hole for passing into a signal feeder and electrically connecting the radiating metal plate, such that the radiating metal plate defines a signal feeding terminal, and an end of the signal feeder is passed through the penetrating hole of the substrate and electrically connected to the circuit contact point area; and a second antenna unit, having a carrier with both ends covered with a first electrode and a second electrode that are electrically connected to the first contact point and the second contact point disposed on the front side of the substrate respectively, and a conducting wire covered onto the surface of a carrier electrically connected between the two electrodes.

2. The miniature combo built-in antenna structure of claim 1, wherein the grounding metal surface includes a plurality of through holes with different diameters disposed around a periphery of the grounding metal surface, and a conductor is passed through the through hole with a smaller diameter and the grounding metal surface at the backside of the substrate.

3. The miniature combo built-in antenna structure of claim 2, wherein the conductor is a conducting wire, a solder or a conducting pillar.

4. The miniature combo built-in antenna structure of claim 1, wherein the first signal output contact point is electrically connected to a cable for transmitting an output signal to a global positioning system.

5. The miniature combo built-in antenna structure of claim 1, further comprising a circuit electrically connected to the circuit contact point area at the backside of the substrate, wherein the circuit comprises a first low noise amplifier, a filter circuit, a second low noise amplifier and a DC bias circuit.

6. The miniature combo built-in antenna structure of claim 1, wherein the micro strip line is extended electrically from the front side of the substrate to the backside of the substrate through the through hole.

7. The miniature combo built-in antenna structure of claim 1, wherein the contact point of the micro strip line is electrically connected to a cable for transmitting an output signal to a TMC receiving module.

8. The miniature combo built-in antenna structure of claim 1, further comprising a contact point electrically connected between the micro strip line at the backside of the substrate and the grounding metal surface for electrically connecting the match circuit.

9. The miniature combo built-in antenna structure of claim 1, further comprising a circuit contact point area electrically connected between the micro strip line at the backside of the substrate and a circuit electrically connected to the second signal output contact point comprises a low noise amplifier.

10. The miniature combo built-in antenna structure of claim 1, further comprising a circuit contact point area electrically connected between the micro strip line at the backside of the substrate, and a circuit electrically connected to the second signal output contact point comprises a match circuit and a low noise amplifier.

11. The miniature combo built-in antenna structure of claim 1, further comprising metal plates with a larger area extended from the second contact point and disposed on the front side and backside of the substrate respectively, and the two metal plate have the functions of fine tuning frequency or improving radiating efficiency.

12. The miniature combo built-in antenna structure of claim 1, wherein the first antenna unit is a cubic patch antenna unit.

13. The miniature combo built-in antenna structure of claim 1, wherein the first antenna unit is an antenna unit of a GPS receiving module.

14. The miniature combo built-in antenna structure of claim 1, wherein the base is made of a dielectric material with a high dielectric constant (K>4).

15. The miniature combo built-in antenna structure of claim 1, wherein the signal feeder is substantially T-shaped, having a hemispherical hemispherical head electrically connected to the radiating metal plate, such that the radiating metal plate defines a signal receiving terminal, and the signal feeder defines a signal feeding terminal.

16. The miniature combo built-in antenna structure of claim 1, wherein the second antenna unit is a FM channel receiving antenna unit.

17. The miniature combo built-in antenna structure of claim 1, wherein the carrier is a rectangular solid made of a dielectric material with a high dielectric constant (>4).

18. The miniature combo built-in antenna structure of claim 1, wherein the conducting wire covered onto the carrier is substantially helix.

* * * * *